US 6,704,709 B1

(12) United States Patent
Kahn et al.

(10) Patent No.: US 6,704,709 B1
(45) Date of Patent: *Mar. 9, 2004

(54) SYSTEM AND METHOD FOR IMPROVING THE ACCURACY OF A SPEECH RECOGNITION PROGRAM

(75) Inventors: Jonathan Kahn, Crown Point, IN (US); Thomas P Flynn, Crown Point, IN (US); Charles Qin, Lake Zurich, IL (US); Nicholas A. Linden, Cedar Lake, IN (US)

(73) Assignee: Custom Speech USA, Inc., Crown Point, IN (US)

( * ) Notice: Subject to any disclaimer, the term of this patent is extended or adjusted under 35 U.S.C. 154(b) by 123 days.

This patent is subject to a terminal disclaimer.

(21) Appl. No.: 09/625,657

(22) Filed: Jul. 26, 2000

Related U.S. Application Data

(63) Continuation-in-part of application No. 09/362,255, filed on Jul. 28, 1999.
(60) Provisional application No. 60/208,878, filed on Jun. 1, 2000.

(51) Int. Cl.[7] .......................... G01L 15/26; G01L 15/04; G01L 15/28
(52) U.S. Cl. ....................................... 704/235; 704/251
(58) Field of Search ................................ 704/235, 231, 704/251

(56) References Cited

U.S. PATENT DOCUMENTS

| | | | | |
|---|---|---|---|---|
| 5,960,447 A | * | 9/1999 | Holt et al. ................... | 704/235 |
| 6,006,183 A | * | 12/1999 | Lai et al. ..................... | 704/235 |
| 6,064,957 A | * | 5/2000 | Brandow et al. ........... | 704/235 |
| 6,064,965 A | * | 5/2000 | Hanson ....................... | 704/235 |
| 6,151,576 A | * | 11/2000 | Warnock et al. ............ | 704/235 |
| 6,195,635 B1 | * | 2/2001 | Wright ........................ | 704/235 |

OTHER PUBLICATIONS

Dragon Naturally Speaking™ Professional "Getting Started" © 1986–1998 Dragon Systems, Inc.*

* cited by examiner

*Primary Examiner*—Richemond Dorvil
*Assistant Examiner*—Daniel Nolan
(74) *Attorney, Agent, or Firm*—Sonnenschein Nath & Rosenthal

(57) ABSTRACT

A system and method for improving the accuracy of a speech recognition program. The system is based on a speech recognition program that automatically converts a pre-recorded audio file into a written text. The system parses the written text into segments, each of which can be corrected by the system and saved in a retrievable manner in association with the computer. The standard speech files are saved towards improving accuracy in speech-to-text conversion by the speech recognition program. The system further includes facilities to repetitively establish an independent instance of the written text from the pre-recorded audio file using the speech recognition program. This independent instance can then be broken into segments and each erroneous segment in said independent instance replaced with the corrected segment associated with that segment. In this manner, repetitive instruction of a speech recognition program can be facilitated.

5 Claims, 9 Drawing Sheets

SYSTEM AND METHOD FOR IMPROVING THE ACCURACY OF A SPEECH RECOGNITION PROGRAM

CROSS REFERENCE TO RELATED APPLICATIONS

This application is a continuation of non-provisional patent application corresponding to provisional patent application Ser. No. 60/208,878 filed on Jun. 1, 2000 entitled "System and Method for Improving the Accuracy of a Speech Recognition Program" and a continuation-in-part of co-pending patent application U.S. application Ser. No. 09/362,255 filed on Jul. 28, 1999 entitled "System and Method for Improving the Accuracy of a Speech Recognition Program."

BACKGROUND OF THE INVENTION

1. Field of the Invention

The present invention relates in general to computer speech recognition systems and, in particular, to a system and method for expediting the aural training of an automated speech recognition program.

2. Background Art

Speech recognition programs are well known in the art. While these programs are ultimately useful in automatically converting speech into text, many users are dissuaded from using these programs because they require each user to spend a significant amount of time training the system. Usually this training begins by having each user read a series of pre-selected materials for several minutes. Then, as the user continues to use the program, as words are improperly transcribed the user is expected to stop and train the program as to the intended word thus advancing the ultimate accuracy of the speech files. Unfortunately, most professionals (doctors, dentists, veterinarians, lawyers) and business executive are unwilling to spend the time developing the necessary speech files to truly benefit from the automated transcription.

Accordingly, it is an object of the present invention to provide a system that offers expedited training of speech recognition programs. It is an associated object to provide a simplified means for providing verbatim text files for training the aural parameters (i.e. speech files, acoustic model and/or language model) of a speech recognition portion of the system.

Another object of the present invention is to provide a system that can increase the speed of the speech recognition training by training the speech recognition software with only the segments of transcribed speech that are determined to be erroneous.

It is an associated object of the present invention to provide a system that can recognize segments of text that require correction without the need to run speech recognition software in the background.

These and other objects will be apparent to those of ordinary skill in the art having the present drawings, specification and claims before them.

SUMMARY OF THE INVENTION

The present invention relates to a system for improving the accuracy of a speech recognition program. The system includes means for automatically converting a pre-recorded audio file into a written text. The system also includes means for parsing the written text into segments and for correcting each and every segment of the written text. In a preferred embodiment, a human speech trainer is presented with the text and associated audio for each and every segment. The segments that are ultimately modified by the human speech trainer are stored in a retrievable manner in association with the computer. The system further includes means for saving speech files associated with a substantially corrected written text and used by the speech recognition program towards improving accuracy in speech-to-text conversion. The system finally includes means for repetitively establishing an independent instance of the written text from the pre-recorded audio file using the speech recognition program and for replacing those segments that required correction in the independent instance of the written text with the corrected segments associated therewith.

In the preferred embodiment of the invention the means for parsing the written text into segments includes means for directly accessing the functions of the speech recognition program. The parsing means may include means to determine the character count to the beginning of the segment and means for determining the character count to the end of the segment. Such parsing means may further include the UtteranceBegin function of Dragon Naturally Speaking™ to determine the character count to the beginning of the segment and the UtteranceEnd function of Dragon Naturally Speaking™ to determine the character count to the end of the segment.

The means for automatically converting a pre-recorded audio file into a written text may further be accomplished by executing functions of Dragon Naturally Speaking™. The means for automatically converting may include the TranscribeFile function of Dragon Naturally Speaking™.

In one embodiment, the correcting means further includes means for highlighting likely errors in the written text. In such an embodiment, where the written text is at least temporarily synchronized to said pre-recorded audio file, the highlighting means further includes means for sequentially comparing a copy of the written text with a second written text resulting in a sequential list of unmatched words culled from the written text and means for incrementally searching for the current unmatched word contemporaneously within a first buffer associated with the speech recognition program containing the written text and a second buffer associated with a sequential list of possible errors. Such element further includes means for correcting the current unmatched word in the second buffer.

In one embodiment, the correcting means includes means for displaying the current unmatched word in a manner substantially visually isolated from other text in the written text and means for playing a portion of said synchronized voice dictation recording from said first buffer associated with said current unmatched word. The correcting means may further include means for alternatively viewing the current unmatched word in context within the copy of the written text.

The second written text may be established by a second speech recognition program having at least one conversion variable different from said speech recognition program. Alternatively, the second written text may be established by one or more human beings.

The invention further involves a method for improving the accuracy of a speech recognition program operating on a computer comprising: (a) automatically converting a pre-recorded audio file into a written text; (b) parsing the written text into segments; (c) correcting each and every segment of the written text; (d) saving the corrected segments in a retrievable manner; (e) saving speech files associated with a substantially corrected written text and used by the speech recognition program towards improving accuracy in speech-to-text conversion by the speech recognition program; (f) establishing an independent instance of the written text from the pre-recorded audio file using the speech recognition program; (g) replacing erroneous segments in the independent instance of the written text with the individually retrievable saved corrected segment associated therewith; (h) saving speech files associated with the independent instance of the written text used by the speech recognition program towards improving accuracy in speech-to-text conversion by the speech recognition program; and (i) repeating steps (f) through (i) a predetermined number of times.

BEST MODES OF PRACTICING THE INVENTION

Figure 1:
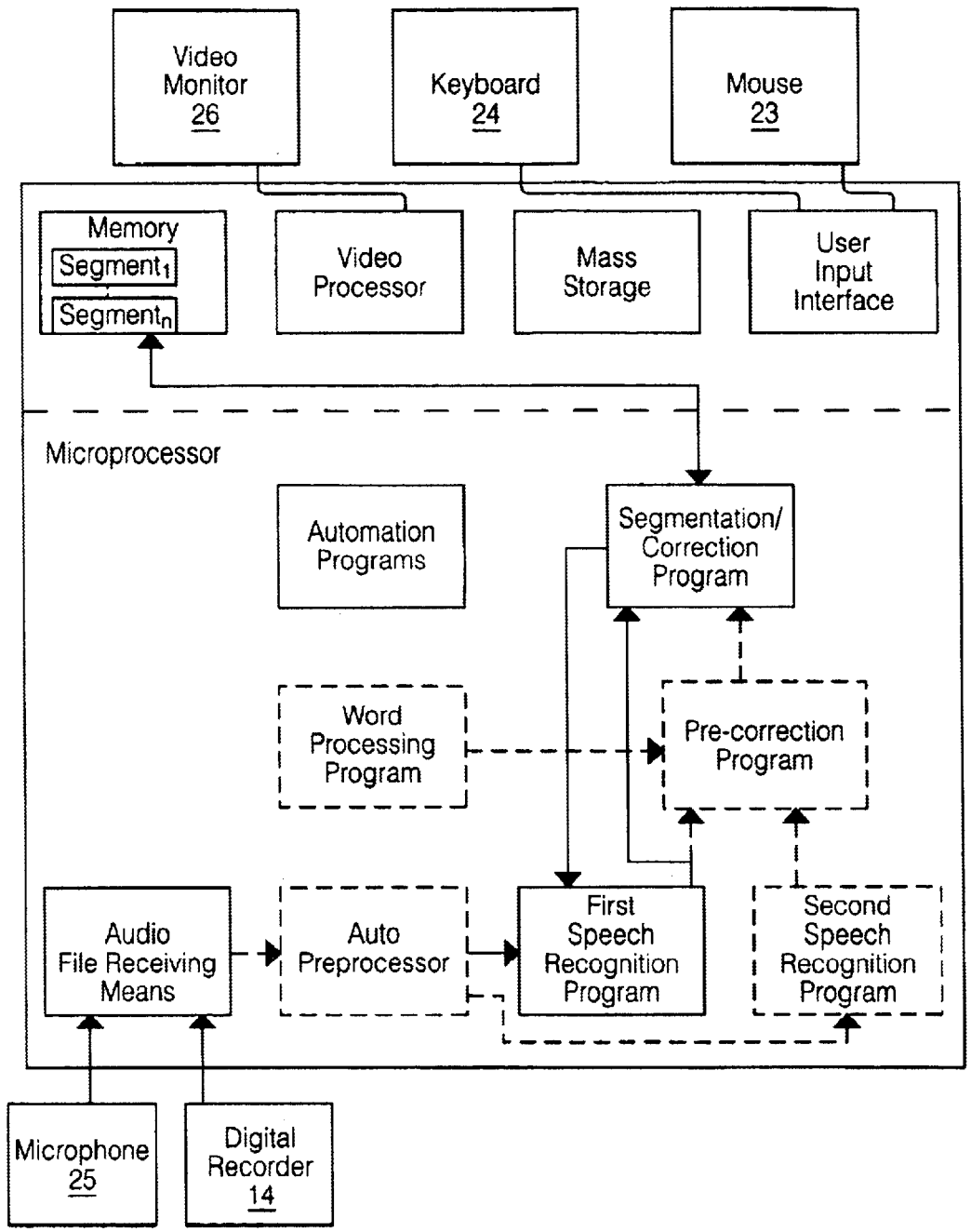
FIG. 1 of the drawings is a block diagram of the system for quickly improving the accuracy of a speech recognition program.

While the present invention may be embodied in many different forms, there is shown in the drawings and discussed herein one specific embodiment with the understanding that the present disclosure is to be considered only as an exemplification of the principles of the invention and is not intended to limit the invention to the embodiment illustrated.

FIG. 1 of the drawings generally shows one potential embodiment of the present system quickly improving the accuracy of a speech recognition program. The system must include some means for receiving a pre-recorded audio file. This audio file receiving means can be a digital audio recorder, an analog audio recorder, or standard means for receiving computer files on magnetic media or via a data connection; preferably implemented on a general-purpose computer (such as computer 20), although a specialized computer could be developed for this specific purpose.

The general-purpose computer should have, among other elements, a microprocessor (such as the Intel Corporation Pentium®, AMD K6® or Motorola 6800® (series); volatile and non-volatile memory; one or more mass storage devices (i.e. HDD, floppy drive, and other removable media devices such as a CD-ROM drive, DITTO™, ZIP™ or JAZ™ drive (from Iomega Corporation) and the like); various user input devices, such as a mouse 23, a keyboard 24, or a microphone 25; and a video display system 26. In one embodiment, the general-purpose computer is controlled by the Windows™ 9.x operating system. It is contemplated, however, that the present system would work equally well using a Macintosh™ computer or even another operating system such as a Windows CE™, UNIX or a JAVA® based operating system, to name a few. In any embodiment, the general purpose computer has amongst its programs a speech recognition program, such as Dragon Naturally Speaking™, IBM's Via Voice™, Lernout & Hauspie's Professional Edition™ or other programs.

Regardless of the particular computer platform used, in an embodiment utilizing an analog audio input (such as via microphone 25) the general-purpose computer must include a sound-card (not shown). Of course, in an embodiment with a digital input no sound card would be necessary to input the file. However, a sound card is likely to be necessary for playback such that the human speech trainer can listen to the pre-recorded audio file toward modifying the written text into a verbatim text.

In one embodiment, the general purpose computer may be loaded and configured to run digital audio recording software (such as the media utility in the Windows™ 9.x operating system, VOICEDOC™ from The Programmers° Consortium, Inc. of Oakton, Va. Cool Edit™ by Syntrillium Corporation of Phoenix, Ariz. or Dragon Naturally Speaking Professional Edition™ by Dragon Systems, Inc. In another embodiment, the speech recognition program may create a digital audio file as a byproduct of the automated transcription process. These various software programs produce a pre-recorded audio file in the form of a "WAV" file. However, as would be known to those skilled in the art, other audio file formats, such as MP3 or DSS, could also be used to format the audio file, without departing from the spirit of the present invention. The method of saving such audio files is well known to those of ordinary skill in the art.

Another means for receiving a pre-recorded audio file is dedicated digital recorder 14, such as the Olympus Digital Voice Recorder D-1000 manufactured by the Olympus Corporation. Thus, if a user is more comfortable with a more conventional type of dictation device, they can use a dedicated digital recorder in combination with this system. In order to harvest the digital audio text file, upon completion of a recording, dedicated digital recorder would be operably connected toward downloading the digital audio file into that general-purpose computer. With this approach, for instance, no audio card would be required.

Another alternative for receiving the pre-recorded audio file may consist of using one form or another of removable magnetic media containing a pre-recorded audio file. With this alternative an operator would input the removable magnetic media into the general-purpose computer toward uploading the audio file into the system.

In some cases it may be necessary to pre-process the audio files to make them acceptable for processing by the speech recognition software. For instance, a DSS file format may have to be changed to a WAV file format, or the sampling rate of a digital audio file may have to be upsampled or downsampled. Software to accomplish such pre-processing is available from a variety of sources including Syntrillium Corporation and Olympus Corporation.

In some manner, an acceptably formatted pre-recorded audio file is provided to at least a first speech recognition program that produces a first written text therefrom. The first speech recognition program may also be selected from various commercially available programs, such as Naturally Speaking™ from Dragon Systems of Newton, Mass. Via Voice™ from IBM Corporation of Armonk, N.Y., or Speech Magic from Philips Corporation of Atlanta, Ga. is preferably implemented on a general-purpose computer, which may be the same general-purpose computer used to implement the pre-recorded audio file receiving means. In Dragon Systems' Naturally Speaking™, for instance, there is built-in functionality that allows speech-to-text conversion of pre-recorded digital audio. In one preferred approach, the present invention can directly access executable files provided with Dragon Naturally Speaking™ in order to transcribe the pre-recorded digital audio.

In an alternative approach, Dragon Systems' Naturally Speaking™ is used by running an executable simultaneously with Naturally Speaking™ that feeds phantom keystrokes and mousing operations through the WIN32API, such that Naturally Speaking™ believes that it is interacting with a human being, when in fact it is being controlled by the microprocessor. Such techniques are well known in the computer software testing art and, thus, will not be discussed in detail. It should suffice to say that by watching the application flow of any speech recognition program, an executable to mimic the interactive manual steps can be created.

In an approach using IBM Via Voice™ —which does not have built-in functionality to allow speech-to-text conversion of pre-recorded audio—a sound card would be configured to "trick" IBM Via Voice™ into thinking that it is receiving audio input from a microphone or in-line when the audio is actually coming from a pre-recorded audio file. Such routing can be achieved, for instance, with a Sound-Blaster Live™ sound card from Creative Labs of Milpitas, Calif.

In a preferred embodiment, the transcription errors in the first written text are located in some manner to facilitate establishment of a verbatim text for use in training the speech recognition program. In one approach, a human transcriptionist establishes a transcribed file, which can be automatically compared with the first written text creating a list of differences between the two texts, which is used to identify potential errors in the first written text to assist a human speech trainer in locating such potential errors to correct same. Such effort could be assisted by the use of specialized software for isolating or highlighting the errors and synchronizing them with their associated audio.

In another approach for establishing a verbatim text, the acceptably formatted prerecorded audio file is also provided to a second speech recognition program that produces a second written text therefrom. The second speech recognition program has at least one "conversion variable" different from the first speech recognition program. Such "conversion variables" may include one or more of the following:

(1) speech recognition programs (e.g. Dragon Systems' Naturally Speaking™, IBM's Via Voice™ or Philips Corporation's Speech Magic);
(2) language models within a particular speech recognition program (e.g. general English versus a specialized vocabulary (e.g. medical, legal);
(3) settings within a particular speech recognition program (e.g. "most accurate" versus "speed"); and/or
(4) the pre-recorded audio file by pre-processing same with a digital signal processor (such as Cool Edit™ by Syntrillium Corporation of Phoenix, Ariz. or a programmed DSP56000 IC from Motorola, Inc.) by changing the digital word size, sampling rate, removing particular harmonic ranges and other potential modifications.

By changing one or more of the foregoing "conversion variables" it is believed that the second speech recognition program will produce a slightly different written text than the first speech recognition program and that by comparing the two resulting written texts a list of differences between the two texts will assist a human speech trainer in locating such potential errors to correct same. Such effort could be assisted by the use of specialized software for isolating or highlighting the errors and synchronizing them with their associated audio.

Figure 2:
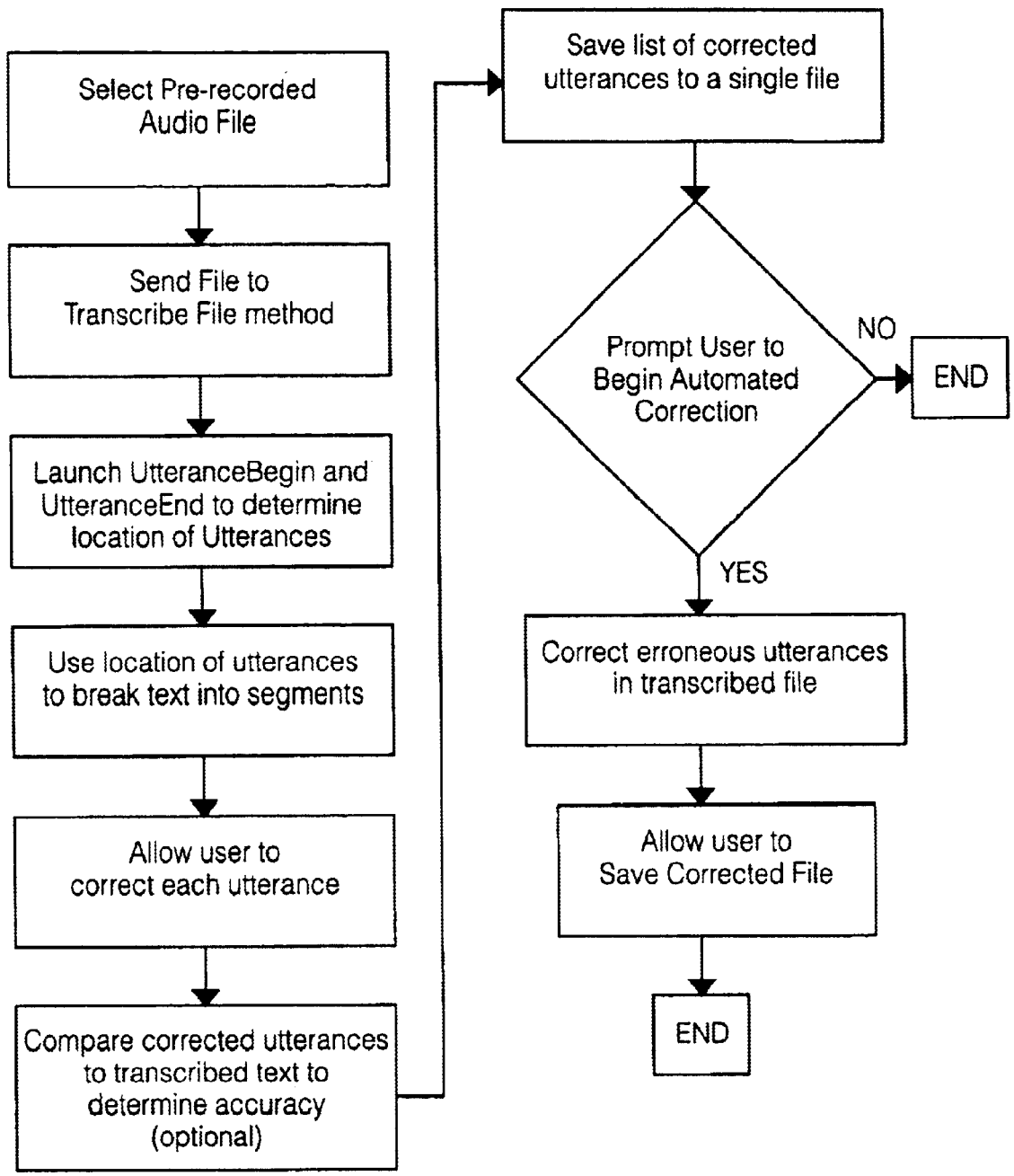
FIG. 2 of the drawings is a flow diagram of the method for quickly improving the accuracy of the Dragon.Naturally Speaking™ software.

In a preferred approach, the present invention can directly access various executable files associated with Dragon Systems' Naturally Speaking™. This allows the present invention to use the built in functionality of Naturally Speaking™ to transcribe pre-recorded audio files. FIG. 2 is a flow diagram of this approach using the Dragon software developer's kit ("SDK"). A user selects an audio file (usually ".wav") for automatic transcription. The selected pre-recorded audio file is sent to the TranscribeFile module of Dictation Edit Control of the Dragon SDK. As the audio is being transcribed, the location of each segment of text is determined automatically by the speech recognition program. For instance, in Dragon, an utterance is defined by a pause in the speech. As a result of Dragon completing the transcription, the text is internally "broken up" into segments according to the location of the utterances by the present invention.

In this approach, the location of the segments is determined by the Dragon SDK UtteranceBegin and UtteranceEnd modules which report the location of the beginning of an utterance and the location of the end of an utterance. For example, if the number of characters to the beginning of the utterance is 100, and to the end of the utterance is 115, then the utterance begins at 100 and has 15 characters. This enables the present system to find the text for audio playback and automated correction. The location of utterances is stored in a listbox for reference.

In Dragon's Naturally Speaking™ these speech segments vary from 1 to, say 20 words depending upon the length of the pause setting in the Miscellaneous Tools section of Dragon Naturally Speaking™. If the end user makes the pause setting long more words will be part of an utterance because a long pause is required before Naturally Speaking™ establishes a different utterance. If the pause setting is made short then there will be more utterances with few words. Once transcription ends (using the TranscribeFile module), the text is captured. The location of the utterances (using the UtteranceBegin and UtteranceEnd modules) is then used to break apart the text to create a list of utterances.

Figure 5:
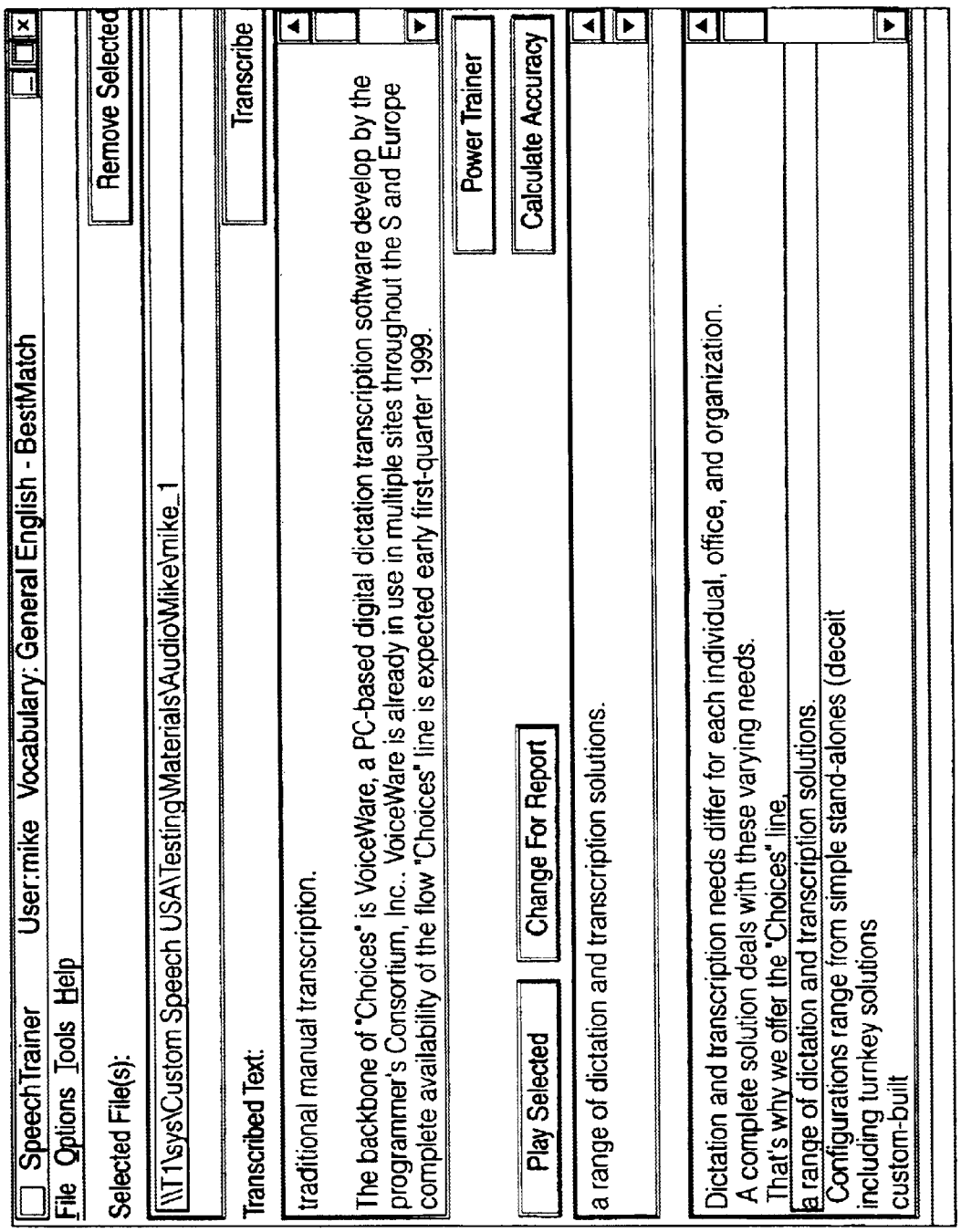
FIG. 5 of the drawings is a plan view of the present system and method showing the highlighting of a segment of text for playback or edit.
Figure 6:
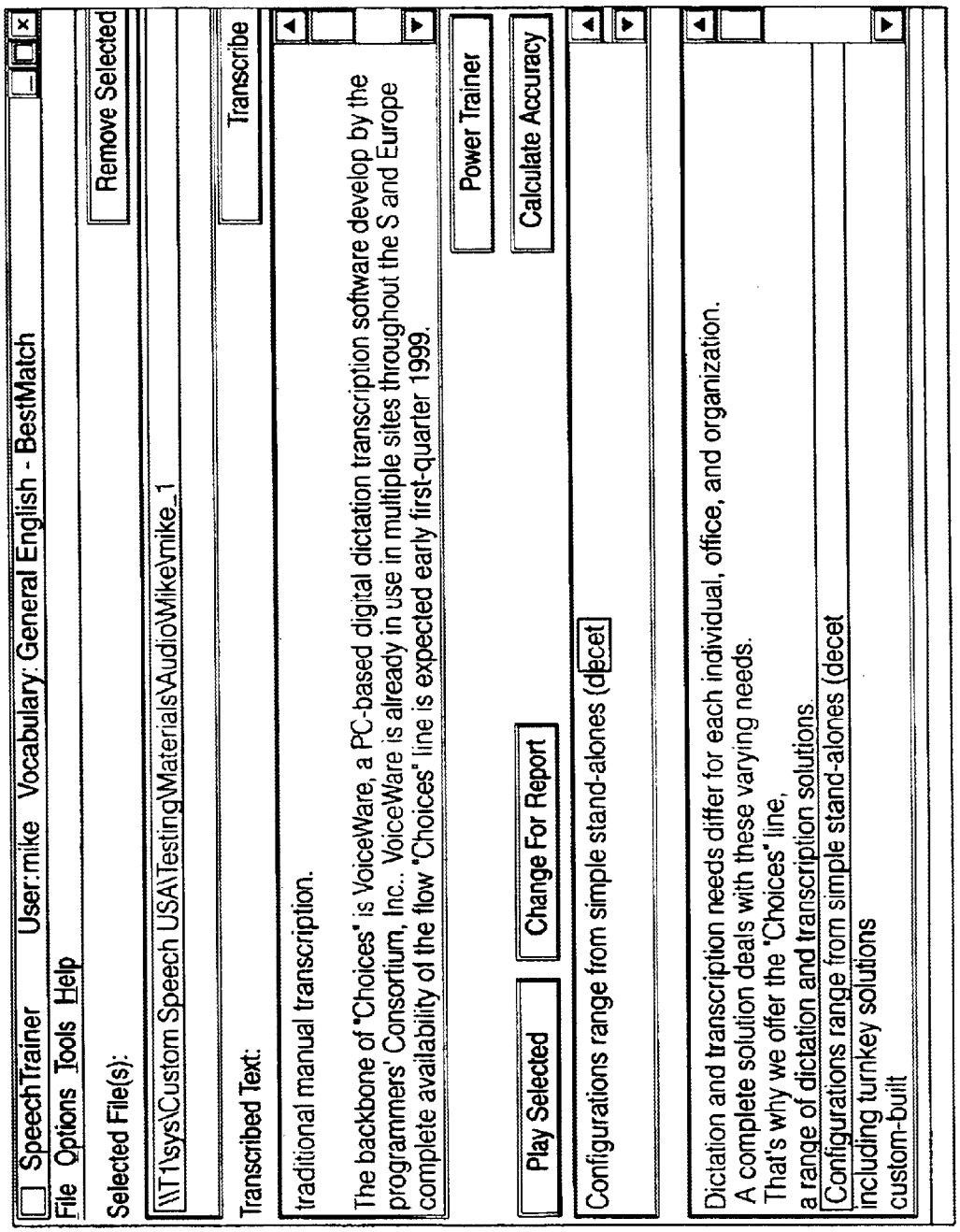
FIG. 6 of the drawings is a plan view of the present system and method showing the highlighting of a segment of text with an error for correction.

Each utterance is listed sequentially in a correction window (see FIG. 5). The display may also contain a window that allows the user to view the original transcribed text. The user then manually examines each utterance to determine if correction is necessary. Using the utterance locations, the present program can play the audio associated with the currently selected speech segment using a "playback" button in the correction window toward comparing the audible text with the selected speech segment in the correction window. If correction is necessary, then that correction is manually input with standard computer techniques (using the keyboard, mouse and/or speech recognition software and, potentially, lists of potential replacement words) (see FIG. 6).

Sometimes the audio is unintelligible or unusable (e.g., dictator sneezes and speech recognition software types out a word, like "cyst" —an actual example). Sometimes the speech recognition program inserts word(s) when there is no detectable audio. Or sometimes when the dictator says a command like "New Paragraph", and rather than executing the command, the speech recognition software types in the words "new" and "paragraph". One approach where there is noise or no sound, is to type in some nonsense word like "xxxxx" for the utterance file so that audio text alignment is not lost. In cases, where the speaker pauses and the system types out "new" and "paragraph, " the words "new" and "paragraph" may be treated as text (and not as command). Although it is also possible to train commands to some extent by replacing, such an error with the voice macro command (e.g. "New-Paragraph"). Thus, it is contemplated that correction techniques may be modified to take into account the limitations and errors of the underlying speech recognition software to promote improved automated training of speech files.

In another potential embodiment, unintelligible or unusable portions of the pre-recorded audio file may be removed using an audio file editor, so that only the usable audio would be used for training the speech recognition program.

Once the speech trainer believes the segment is a verbatim representation of the synchronized audio, the segment in the correction window is manually accepted and the next segment automatically displayed in the correction window. Once the erroneous utterances are corrected, the user may then have the option to calculate the accuracy of the transcription performed by Dragon. This process compares the corrected set of utterances with the original transcribed file. The percentage of correct words can be displayed, and the location of the differences is recorded by noting every utterance that contained an error. The corrected set of utterances is saved to a single file. In a preferred embodiment, all the utterances are saved to this file, not just corrected ones. Thus, this file will contain a corrected verbatim text version of the pre-recorded audio.

Figure 7:
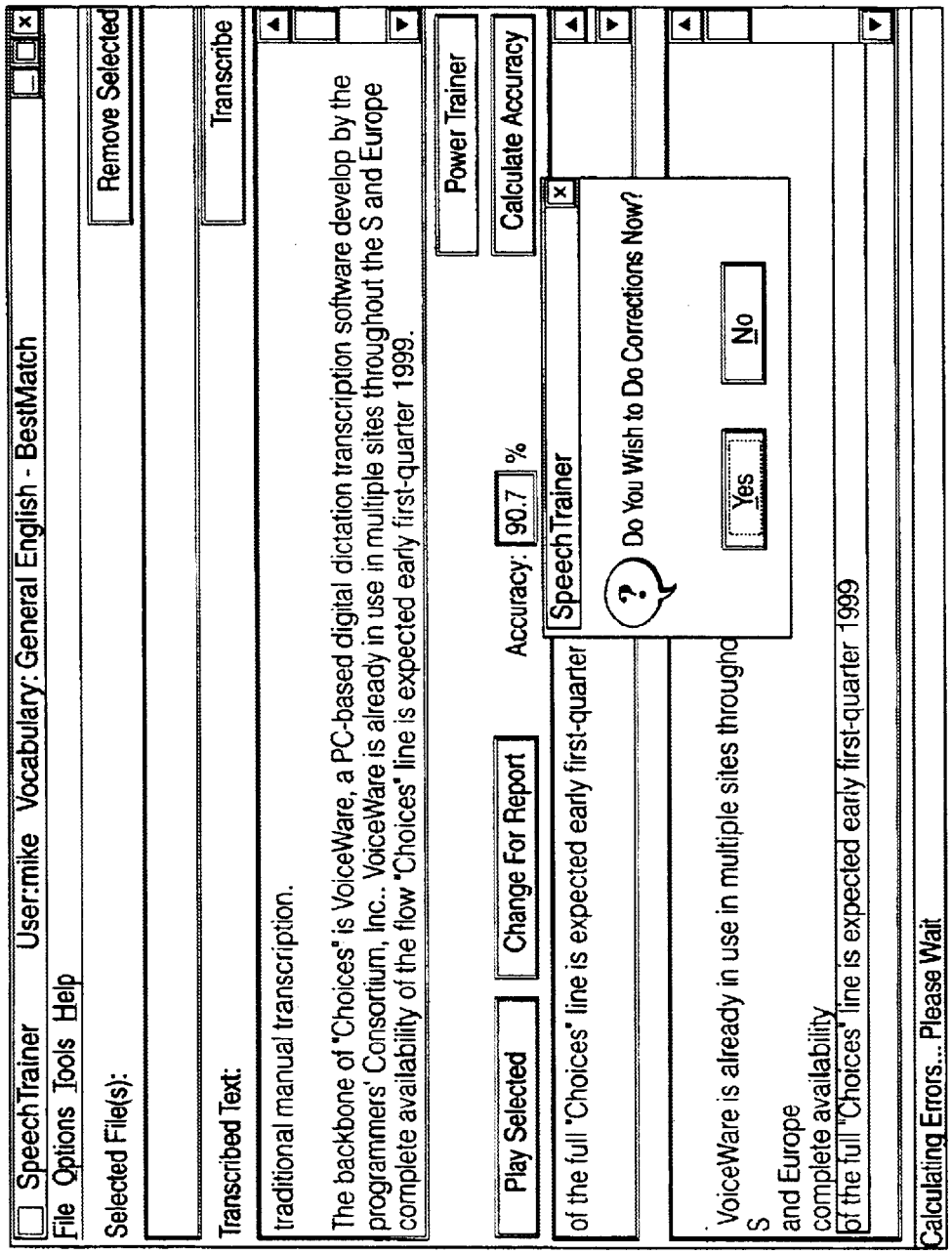
FIG. 7 of the drawings is a plan view of the present system and method showing the initiation of the automated correction method.

The user may then choose to do an automated correction of the transcribed text (see FIG. 7). This process inserts the corrected utterances into the original transcription file via Dragon's correction dialog. In a preferred approach, this correction uses the locations of the differences between the corrected utterances and the transcribed text to only correct the erroneous utterances. After corrections are complete, the user is prompted to Save the Speech file.

Another novel aspect of this invention is the ability to make changes in the transcribed file for the purposes of a written report versus for the verbatim files (necessary for training the speech conversion program). The general purpose of the present invention is to allow for automated training of a voice recognition system. However, it may also happen that the initial recording contains wrong information or the wrong word was actually said during recording (e.g. the user said 'right' during the initial recording when the user meant to say 'left'). In this case, the correction of the text cannot normally be made to a word that was not actually said in the recording as this would hinder the training of the voice recognition system. Thus, in one embodiment the present invention may allow the user to make changes to the text and save this text solely for printing or reporting, while maintaining the separate verbatim file to train the voice recognition system.

One potential user interface for implementing the segmentation/correction scheme is shown in FIG. 5. In FIG. 5, the program has selected "a range of dictation and transcription solutions" as the current speech segment. The human speech trainer listening to the portion of pre-recorded audio file associated with the currently displayed speech segment, looking at the correction window and perhaps the speech segment in context within the transcribed text determines whether or not correction is necessary. By clicking on the "Play Selected" button the audio synchronized to the particular speech segment is automatically played back. Once the human speech trainer knows the actually dictated language for that speech segment, they either indicate that the present text is correct or manually replace any incorrect text with verbatim text. In a preferred approach, in either event, the corrected/verbatim text from the correction window is saved into a single file containing all the corrected utterances.

Figure 4:
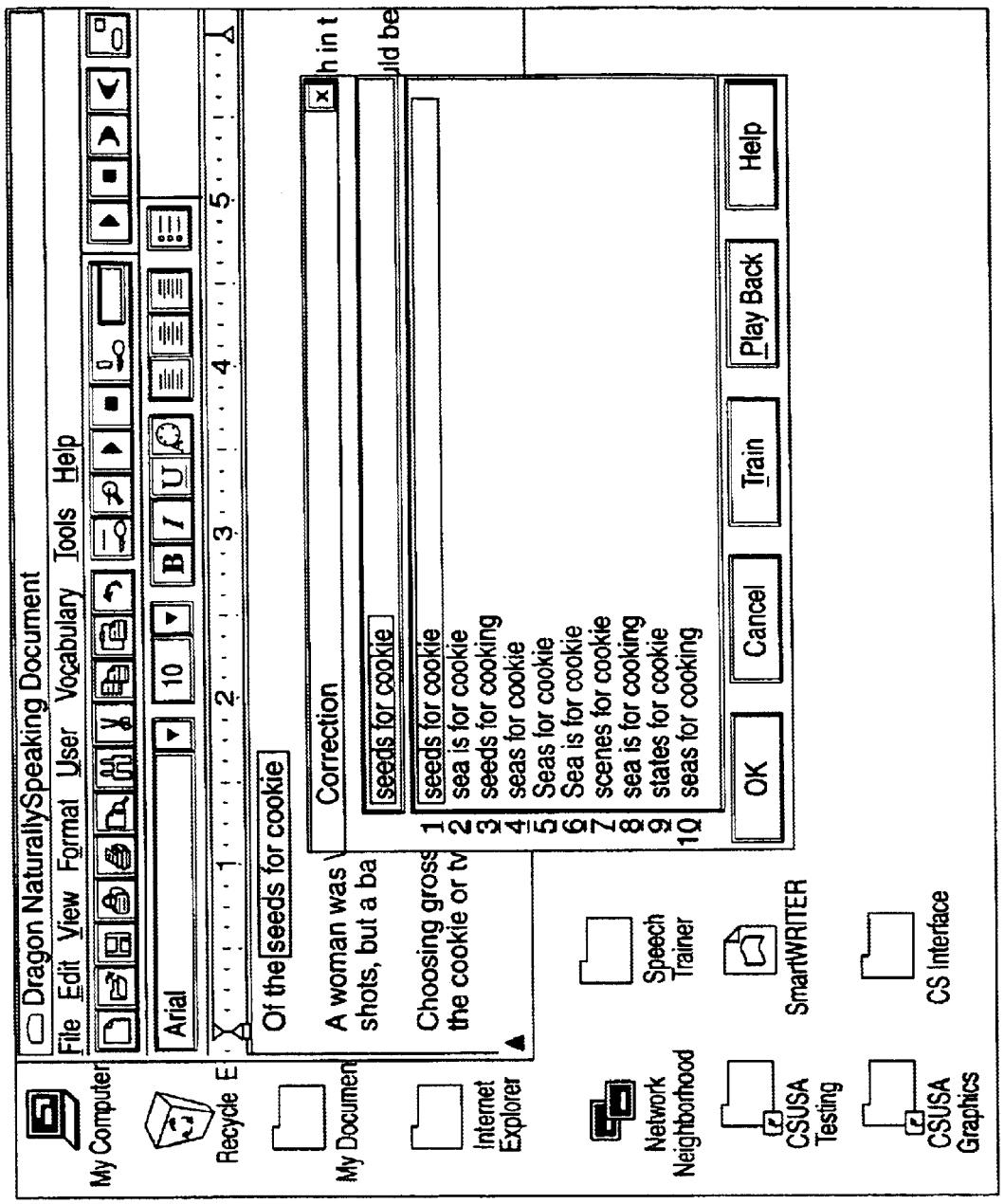
FIG. 4 of the drawings is a plan view of the present system and method in operation in conjunction with Dragon Naturally Speaking™ software.

Alternatively, another approach to correcting the written text may use Dragon Naturally Speaking™'s user interface by using executables simultaneously operating with the speech recognition means that feeds phantom keystrokes and mousing operations through the WIN32API (See FIG. 4). In FIG. 4, the Dragon Naturally Speaking™ program has selected "seeds for cookie" as the current speech segment (or utterance in Dragon parlance). As in the other approach, the human speech trainer listening to the portion of pre-recorded audio file associated with the currently displayed speech segment, looking at the correction window and perhaps the speech segment in context within the transcribed text determines whether or not correction is necessary. By clicking on the "Play Back" button the audio synchronized to the particular speech segment is automatically played back. As in the other approach, once the human speech trainer knows the actually dictated language for that speech segment, they either indicate that the present text is correct (by merely pressing an "OK" button) or manually replace any incorrect text with verbatim text. As in the other approach, in either event, the corrected/verbatim text from the correction window is preferably saved into a single file containing all the corrected utterances.

Figure 3:
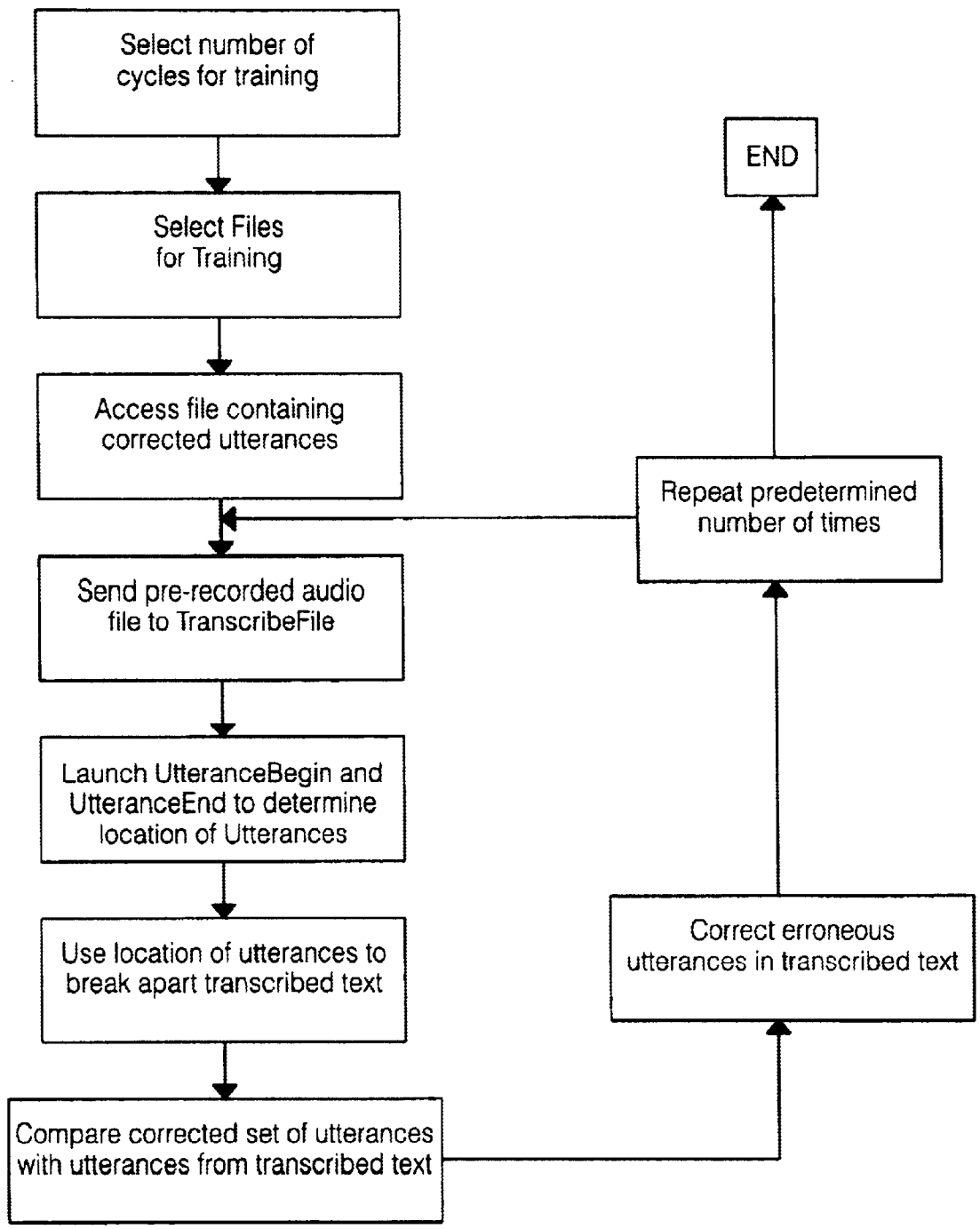
FIG. 3 of the drawings is a flow diagram of the method for automatically training the Dragon Naturally Speaking™ software.
Figure 8:
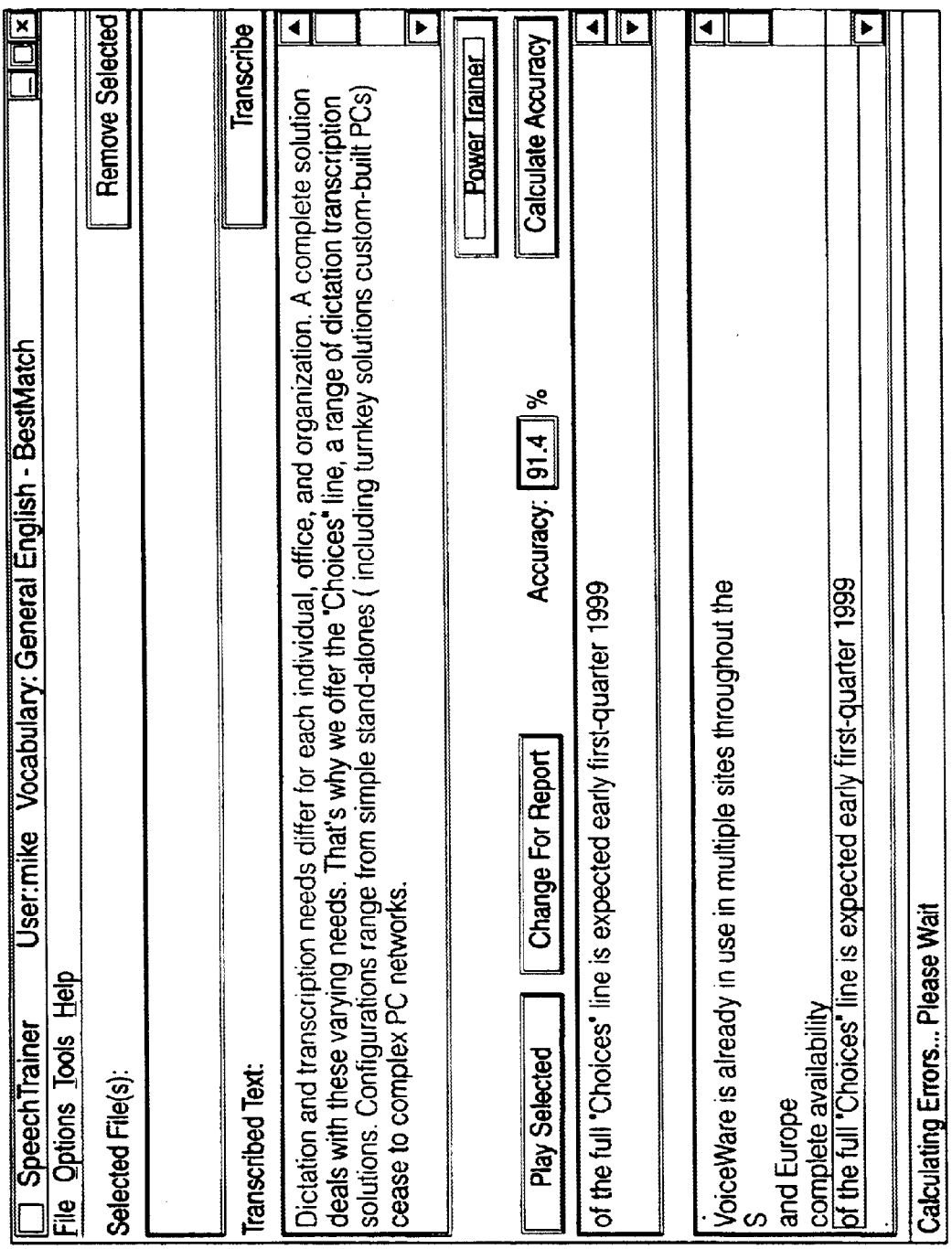
FIG. 8 of the drawings is a plan view of the present system and method showing the initiation of the automated training method.
Figure 9:
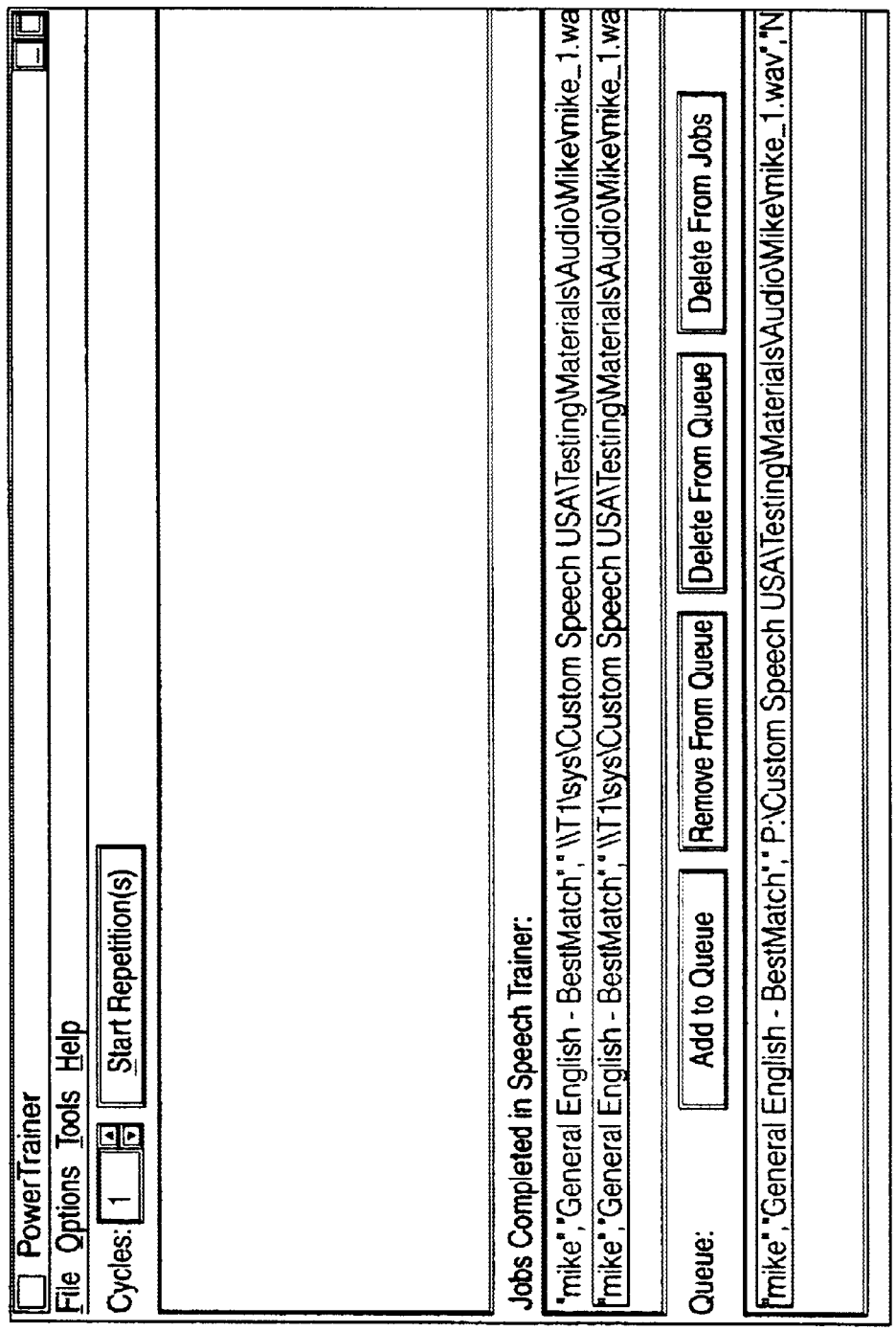
FIG. 9 of the drawings is a plan view of the present system and method showing the selection of audio files for training for addition to the queue.

Once the verbatim text is completed (and preferably verified for accuracy), the file containing the corrected utterances can be used to train the speech recognition program (see FIG. 8). FIG. 3 is a flow diagram describing the training process. The user has the option of running the training sequence a selected number of times to increase the effectiveness of the training. The user chooses the file on which to perform the training. The chosen files are then transferred to the queue for processing (FIG. 9). Once training is initiated, the file containing the corrected set of utterances is read. The corrected utterances file is opened and read into a listbox. This is not a function of the Dragon SDK, but is instead a basic I/O file. The associated pre-recorded audio file is sent to TranscribeFile method of DictationEditControl from the Dragon SDK. (In particular, the audio file is sent by running the command "FrmControls.DeTop2.TranscribeFile filename;" FrmControls is the form where the Dragon SDK ActiveX Controls are located; DeTop2 is the name of the controls.) Transcribe File is the function of controls for transcribing wave files. In conjunction with this transcribing, the UtteranceBegin and UtteranceEnd methods of DragonEngineControl report the location of utterances in the same manner as previously described. Once transcription ends, the location of the utterances that were determined are used to break apart the text. This set of utterances is compared to the list of corrected utterances to find any differences. One program used to compare the differences (native to Windows 9.x) may be File Compare. The location of the differences are then stored in a listbox. Then the locations of differences in the list box are used to only correct the utterances that had differences. Upon completion of correction, speech files are automatically saved. This cycle can then be repeated the predetermined number of times.

Once training is complete, TranscribeFile can be initiated one last time to transcribe the pre-recorded audio. The location of the utterances are not calculated again in this step. This transcribed file is compared one more time to the corrected utterances to determine the accuracy of the voice recognition program after training.

By automating this process, the present system can produce a significant improvement in the accuracy of the speech recognition program.

Alternatively, the training process can be automated by using an executable file simultaneously operating with the speech recognition means that feeds phantom keystrokes and mousing operations through the WIN32API, such that the first speech recognition program believes that it is interacting with a human being, when in fact it is being controlled by the microprocessor. In this approach, the video and storage buffer of the speech recognition program are first cleared. Next, the pre-recorded audio file is loaded into the first speech recognition program, in the same manner disclosed above. Third, a new written text is established by the first speech recognition program. Fourth, the segmentation/correction program utilizes the speech recognition program's parsing system to sequentially identify speech segments and places each and every one of those speech segments into a correction window—whether correction is required on any portion of those segments or not—seriatim. Fifth, the system automatically replaces the next segment of erroneous text in the correction window using the saved corrected segments file. That text is then pasted into the underlying Dragon Naturally Speaking™ buffer. The fourth and fifth steps are repeated until all of the erroneous segments have been replaced.

This selection and replacement of erroneous text segments within the buffer leads to an improvement in the aural parameters of the speech recognition program for the particular speech user that recorded the pre-recorded audio file. In this manner, the accuracy of first speech recognition program's speech-to-text conversion can be markedly, yet quickly improved.

The foregoing description and drawings merely explain and illustrate the invention and the invention is not limited thereto. Those of the skill in the art who have the disclosure before them will be able to make modifications and variations therein without departing from the scope of the present invention.

What is claimed is:

1. A system for improving the accuracy of a speech recognition program operating on a computer, said system comprising:

means for automatically converting a pre-recorded audio file into a written text;

means for parsing said written text into segments;

means for correcting each and every segment of said written text, said correcting means further including means for highlighting likely errors in said written text;

means for saving each corrected segment in a retrievable manner in association with said computer, means for saving speech files associated with a substantially corrected written text and used by said speech recognition program towards improving accuracy in speech-to-text conversion by said speech recognition program; and means for repetitively establishing an independent instance of said written text from said pre-recorded audio file using said speech recognition program and for automatically replacing each erroneous segment in said independent instance of said written text with said corrected segment associated therewith, wherein said written text is at least temporarily synchronized to said pre-recorded audio file, said highlighting means comprises:

means for sequentially comparing a copy of said written text with a second written text resulting in a sequential list of unmatched words culled from said copy of said written text, said sequential list having a beginning, an end and a current unmatched word, said current unmatched word being successively advanced from said beginning to said end;

means for incrementally searching for said current unmatched word contemporaneously within a first buffer associated with the speech recognition program containing said written text and a second buffer associated with said sequential list; and means for correcting said current unmatched word in said second buffer, said correcting means including means for displaying said current unmatched word in a manner substantially visually isolated from other text in said copy of said written text and means for playing a portion of said synchronized voice dictation recording from said first buffer associated with said current unmatched word.

2. The invention according to claim 1 wherein said second written text is established by a second speech recognition program having at least one conversion variable different from said speech recognition program.

3. The invention according to claim 1 wherein said second written text is established by one or more human beings.

4. The invention according to claim 1 wherein said correcting means further includes means for alternatively viewing said current unmatched word in context within said copy of said written words.

5. A method for improving the accuracy of a speech recognition program operating on a computer comprising:

(a) automatically converting a pre-recorded audio file into a written text;

(b) parsing the written text into segments;

(c) correcting each and every segment of the written text;

(d) saving each corrected segment in a retrievable manner;

(e) saving speech files associated with a substantially corrected written text and used by the speech recognition program towards improving accuracy in speech-to-text conversion by the speech recognition program;

(f) establishing an independent instance of the written text from the pre-recorded audio file using the speech recognition program;

(g) automatically replacing each erroneous segment in the independent instance of the written text with the corrected segment associated therewith;

(h) saving speech files associated with the independent instance of the written text used by the speech recognition program towards improving accuracy in speech-to-text conversion by the speech recognition program;

(i) repeating steps (f) through (i) a predetermined number of times; and (j) highlighting likely errors in said written text, wherein highlighting includes:

comparing sequentially a copy of said written text with a second written text resulting in a sequential list of unmatched words culled from said copy of said written text, said sequential list having a beginning, an end and a current unmatched word, said current unmatched word being successively advanced from said beginning to said end;

searching incrementally for said current unmatched word contemporaneously within a first buffer associated with the speech recognition program containing said written text and a second buffer associated with said sequential list; and correcting said current unmatched word in said second buffer, said correcting means including means for displaying said current unmatched word in a manner substantially visually isolated from other text in said copy of said written text and means for playing a portion of said synchronized voice dictation recording from said first buffer associated with said current unmatched word.

* * * * *